3,308,129
3-TROPANYL ESTERS OF ATROPIC AND THIOATROPIC ACIDS

Henry C. Caldwell, Ambler, and William G. Groves, Norristown, Pa., assignors to Smith Kline & French Laboratories, Philadelphia, Pa., a corporation of Pennsylvania
No Drawing. Filed June 5, 1964, Ser. No. 373,044
7 Claims. (Cl. 260—292)

This invention relates to novel substituted 3-tropanyl and 3-thiotropanyl atropate derivatives having valuable pharmacodynamic activity. More specifically, these compounds possess gastrointestinal spasmolytic activity. These novel compounds are particularly advantageous because they produce the spasmolytic activity without the concomitant mydriatic and antisalivary side effects which are common to known anticholinergic antispasmodic drugs. For example, when comparing the novel compounds of this invention with well known anticholinergic agents for undesirable side effects such as for mydriatic and antisalivary effect the following results were obtained. Using a modified Pulewka test for mydriatic activity it was found that atropine had an $ED_6$ of 0.88 mg./kg. in mice. In other words, the dose needed to increase pupil diameter by 6 units was 0.88 mg./kg. When a representative compound of this invention, 3-tropanyl-p-chloroatropate, was tested there was no dilation of the pupils (mydriasis) even at lethal doses. Further, testing the same compounds in a standard antisalivary test consisting of blockade of Furmethide induced salivation showed atropine to have an $ED_{50}$ of 0.59 mg./kg., i.e., 50% of the mice had dry mouth at this dose. Again, when testing 3-tropanyl-p-chloroatropate none of the mice showed dry mouth after 20 mg./kg.

The novel substituted 3-tropanyl and thiotropanyl atropate derivatives of this invention are represented by the following general formula:

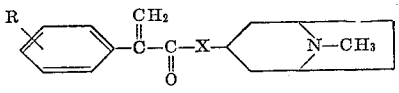

(Formula I)

when X represents oxygen or sulfur and R represents halogen, such as chloro, bromo or fluoro, a straight or branched chain lower alkyl, preferably of 1 to 6 carbon atoms, lower alkoxy of 1 to 6 carbon atoms or trifluoromethyl.

Advantageous compounds of this invention are represented by the above structural formula when X represents oxygen and R represents halogen or trifluoromethyl in the para position.

The compound of this invention which is particularly advantageous is 3-tropanyl-p-chloroatropate.

The novel substituted tropanyl and thiotropanyl atropates are prepared according to the following synthetic procedure:

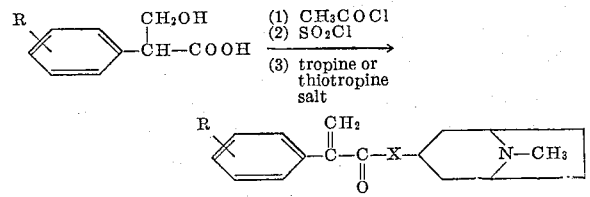

in which R and X are as described above.

This method is carried out using readily available starting materials and gives excellent yields of the end product. Where certain compounds desired for use as starting materials are not available they can be prepared by methods described in the literature and well known to the art. For example, thiotropine can be prepared by reducing tropinone with hydrogen sulfide or sulfur as detailed in Ind. Eng. Chem., 42, 2547 (50), for the reduction of cyclohexanone to cyclohexanethiol.

The properly substituted phenylacetic acid is converted to the tropic acid derivative by placing the acid in an organic solvent, preferably benzene and slowly adding it to a reflux mixture of ether, magnesium turnings and isopropyl chloride. The mixture is then refluxed for approximately two hours after the addition of the acid is completed and then cooled. Paraformaldehyde is then distilled into the mixture with stirring. The mixture is then poured into ice and concentrated sulfuric acid and again stirred. The crude solid which forms is then filtered and recrystallized from water and dried. The solid is further purified by treatment with hot water and benzene. The product is filtered from cool aqueous solution to yield the properly substituted tropic acid.

The tropic acid derivative is then converted to the desired 3-tropanyl atropate by preparing a solution of the tropic acid in acetyl chloride and refluxing. Thionyl chloride is then added with continued refluxing. The excess thionyl chloride is removed and either tropine or thiotropine hydrobromide in pyridine is added and the mixture heated. The mixture is cooled with the addition of water and the resultant solid filtered and recrystallized from water to yield the desired 3-tropanyl atropate derivative.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzeneslfonic and theophylline acetic acids as well as with the 8-halotheophyllines for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well known to the art.

Further, exemplary of salts are nontoxic quaternary ammonium salts of the above defined bases formed with pharmacologically acceptable lower alkyl or aralkyl esters of, for example, sulfuric, hydrohalic and aromatic sulfonic acids. These salts are prepared by treating a solution of the base in a suitable solvent, such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such reactive esters are lower alkyl halides of a maximum of 8 carbon atoms such as methyl chloride, methyl bromide, methyl iodide, ethyl chloride, ethyl bromide, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfate and ethyl toluene sulfonate.

It will be readily apparent to one skilled in the art that variations of these procedures are possible. The preferable preparative procedures are the methods discussed above.

The tropanyl and thiotropanyl derivatives of this invention are preferably employed in combination with either a liquid or solid nontoxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums such as acacia, terra alba, stearic acid, sorbitol, mannitol, ethyl cellulose or gelatin. The amount of solid carrier will vary widely but preferably is from about 25 mg. to about 1 gm. If a liquid carrier is used the preparation can be in the form of a soft gelatin capsule, placed in an ampule or in a liquid suspension.

The novel compounds of this invention are administered usually in dosage units, internally, preferably orally to animals, in effective but nontoxic amounts to induce the desired pharmacodynamic effect. Advantageously equal daily doses are administered to provide a daily dosage regimen which produces antispasmodic activity without the extremely disadvantageous side effects of the anticholinergic antispasmodics of the prior art.

The following examples are not limiting but are illustrative of compounds of this invention and the procedures for their preparation. Other variations of this invention will be obvious to those skilled in this art. For example, also included within the scope of this invention are the 8 lower alkyl nor tropane derivatives.

Example 1

To a mixture under nitrogen containing 500 ml. of anhydrous ether, 27.6 g. of magnesium turnings and 11 drops of ethyl bromide is added 15 ml. of isopropyl chloride. The mixture is warmed until the reaction proceeds and 87 ml. more of isopropyl chloride is added and the mixture refluxed moderately for approximately one hour. A solution of 85.2 g. of p-chlorophenylacetic acid in 500 ml. of dry benzene is then added and the mixture further refluxed for approximately two hours. 500 g. of paraformaldehyde is then distilled into the mixture with the aid of a stream of dry nitrogen. The thick solution is stirred for about an hour after the formaldehyde distillation is completed and the mixture then poured into ice and 200 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding p-chlorotropic acid as a white solid melting at 142–143° C.

20.1 g. of p-chlorotropic acid and 50 ml. of acetyl chloride is warmed gently until a solution results. The clear solution is refluxed for about an hour and the excess acetyl chloride distilled off under reduced pressure. 100 ml. of thionyl chloride is added to the residual oil and the mixture refluxed for about an hour. The excess thionyl chloride is distilled off, 3 separate portions of benzene added and also distilled off. 20.0 g. of tropine hydrobromide in 35 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-tropanyl-p-chloroatropate. An etheral solution of the free base is treated with etheral hydrogen chloride to yield the hydrochloride salt having a melting point of 257–258° C.

Example 2

An acetone solution of the free base, 3-tropanyl-p-chloroatropate, as prepared in Example 1 is reacted with ethyl chloride to yield the ethochloride quaternary salt.

Example 3

To a mixture under nitrogen containing 250 ml. of anhydrous ether, 13.8 g. of magnesium turnings and 8 drops of ethyl bromide is added 7.5 ml. of isopropyl chloride. The mixture is warmed until the reaction proceeds and 45 ml. more of isopropyl chloride is added and the mixture refluxed moderately for approximately one hour. A solution of 42.6 g. of p-methylphenylacetic acid in 250 ml. of dry benzene is then added and the mixture further refluxed for approximately two hours. 250 g. of paraformaldehyde is then distilled into the mixture with the aid of a stream of dry nitrogen. The thick solution is stirred for about an hour after the formaldehyde distillation is completed and the mixture then poured into ice and 100 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding p-methyltropic acid.

10.0 g. of p-methyltropic acid and 30 ml. of acetyl chloride is warmed gently until a solution results. The clear solution is refluxed for about an hour and the excess acetyl chloride distilled off under reduced pressure. 50 ml. of thionyl chloride is added to the residual oil and the mixture refluxed for about an hour. The excess thionyl chloride is distilled off, 3 separate portions of benzene added and also distilled off. 10.0 g. of tropine hydrobromide in 18 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-tropanyl-p-methylatropate. An acetone solution of the free base is reacted with maleic acid to yield the maleate salt.

Example 4

To a mixture under nitrogen containing 375 ml. of anhydrous ether, 21.0 g. of magnesium turnings and 8 drops of ethyl bromide is added 12 ml. of isopropyl chloride. The mixture is warmed until the reaction proceeds and 66 ml. more of isopropyl chloride is added and the mixture refluxed moderately for approximately one hour. A solution of 63.9 g. of m-methoxyphenylacetic acid of 375 ml. of dry benzene is then added and the mixture further refluxed for approximately two hours. 375 g. of paraformaldehyde is then distilled into the mixture with the aid of a stream of dry nitrogen. The thick solution is stirred for about an hour after the formaldehyde distillation is completed and the mixture then poured into ice and 150 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding m-methoxytropic acid.

15.1 g. of m-methoxytropic acid and 38.6 ml. of acetyl chloride is warmed gently until a solution results. The clear solution is refluxed for about an hour and the excess acetyl chloride distilled off under reduced pressure. 75 ml. of thionyl chloride is added to the residual oil and the mixture refluxed for about an hour. The excess thionyl chloride is distilled off, 3 separate portions of benzene added and also distilled off. 15.0 g. of tropine hydrobromide in 27.0 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-tropanyl-m-methoxyatropate. Reacting the free base with bismethylene-salicylic acid in ethyl acetate solution furnishes the bismethylenesalicylate salt.

*Example 5*

To a mixture under nitrogen containing 500 ml. of anhydrous ether, 27.6 g. of magnesium turnings and 11 drops of ethyl bromide is added 15 ml. of isopropyl chloride. The mixture is warmed until the reaction proceeds and 87 ml. more of isopropyl chloride is added and the mixture refluxed moderately for approximately one hour. A solution of 85.2 g. of p-chlorophenylacetic acid in 500 ml. of dry benzene is then added and the mixture further refluxed for approximately two hours. 500 g. of paraformaldehyde is then distilled into the mixture with the aid of a stream of dry nitrogen. The thick solution is stirred for about an hour after the formaldehyde distillation is completed and the mixture then poured into ice and 200 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding p-chlorotropic acid as a white solid melting at 142–143° C.

20.1 g. of p-chlorotropic acid and 50 ml. of acetyl chloride is warmed gently until a solution results. The clear solution is refluxed for about an hour and the excess acetyl chloride distilled off under reduced pressure. 100 ml. of thionyl chloride is added to the residual oil and the mixture refluxed for about an hour. The excess thionyl chloride is distilled off and 3 separate portions of benzene are added and also distilled off. 21.3 g. of thiotropine hydrobromide in 35 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-thiotropanyl-p-chloroatropate.

*Example 6*

To a mixture under nitrogen containing 1000 ml. of anhydrous ether, 55.2 g. of magnesium turnings and 22 drops of ethyl bromide is added 30 ml. of isopropyl chloride. The mixture is warmed until the reaction proceeds and 174 ml. more of isopropyl chloride is added and the mixture refluxed moderately for approximately one hour. A solution of 170 g. of p-trifluoromethylphenylacetic acid in 1000 ml. of dry benzene is then added and the mixture further refluxed for approximately two hours. 1000 g. of paraformaldehyde is then distilled into the mixture with the aid of a stream of dry nitrogen. The thick solution is stirred for about an hour after the formaldehyde distillation is completed and the mixture then poured into ice and 400 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding p-trifluoromethyltropic acid.

40.2 g. of p-trifluoromethyltropic acid and 100 ml. of acetyl chloride is warmed gently until a solution results. The clear solution is refluxed for about an hour and the excess acetyl chloride distilled off under reduced pressure. 200 ml. of thionyl chloride is added to the residual oil and the mixture refluxed for about an hour. The excess thionyl chloride is distilled off, 3 separate portions of benzene added and also distilled off. 40 g. of tropine hydrobromide in 70 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-tropanyl-p-trifluoromethylatropate. An acetone solution of the free base is reacted with ethyl bromide to yield the ethobromide quaternary salt.

What is claimed is:

1. A chemical compound of the formula:

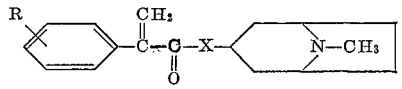

in which X is a member selected from the group consisting of oxygen and sulfur and R is a member selected from the group consisting of halogen, lower alkyl, lower alkoxy and trifluoromethyl.

2. A chemical compound of the structural formula:

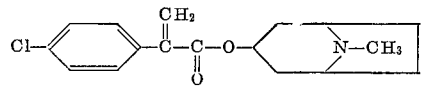

3. 3-tropanyl-p-chloroatropate hydrochloride.
4. 3-tropanyl-p-chloroatropate ethylchloride.
5. A chemical compound of the structural formula:

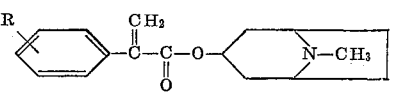

wherein R is halogen.

6. A chemical compound of the structural formula:

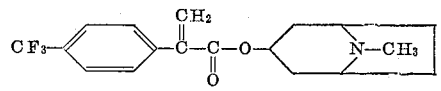

7. A chemical compound of the structural formula:

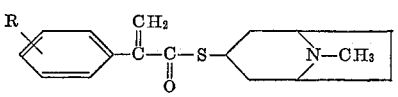

wherein R is halogen.

No references cited.

JOHN D. RANDOLPH, *Primary Examiner.*
ALAN L. ROTMAN, *Assistant Examiner.*